United States Patent

Fellin

[11] 3,955,333
[45] May 11, 1976

[54] CIGAR LIGHTER CLAMP SHELL

[75] Inventor: Frank J. Fellin, Seymour, Tenn.

[73] Assignee: Wagner Electric Corporation, Parsippany, N.J.

[22] Filed: Mar. 17, 1975

[21] Appl. No.: 559,037

[52] U.S. Cl. .............................. 52/758 R; 403/13; 248/27 R; 219/267; 339/130 R
[51] Int. Cl.² .......................................... F16B 7/00
[58] Field of Search ................... 403/13; 248/27 R; 200/196; 219/267; 339/130 R, 130 C

[56] References Cited
UNITED STATES PATENTS

| | | | |
|---|---|---|---|
| 1,565,313 | 12/1925 | Douglas | 339/130 R |
| 2,236,483 | 3/1941 | Bahr | 219/267 |
| 2,910,308 | 10/1959 | Carr | 285/138 X |
| 3,040,160 | 6/1962 | Gaudet et al. | 219/267 |
| 3,887,789 | 6/1975 | Pecota | 219/267 X |

Primary Examiner—Werner H. Schroeder
Assistant Examiner—Wayne L. Shedd
Attorney, Agent, or Firm—Eyre, Mann, Lucas & Just

[57] ABSTRACT

An improved clamp shell for cigar lighters is disclosed. The improvement comprises means associated with the clamp shell for automatically aligning the position of the clamp shell with respect to the cigar lighter socket to aid in assembly of the structure in a motor vehicle.

4 Claims, 3 Drawing Figures

CIGAR LIGHTER CLAMP SHELL

The present invention relates to clamp shells for securing cigar lighter sockets to motor vehicle panels such as dashboards.

As is well known in the art, cigar lighter sockets are normally secured to motor vehicle panels such as dashboards by means of clamp shells. The cigar lighter socket is positioned in an opening in the dashboard and then a clamp shell is secured to the cigar lighter socket from behind the dashboard. The cigar lighter socket normally has external threads which engage internal threads of the clamp shells. In usual manufacturing operations, the cigar lighter socket is rotated by a mechanical device in the opening in the dashboard and the clamp shell is manually fitted over it from the rear. When the threads engage, the clamp shell is moved against the dashboard until a tight fit is obtained.

Due to the position of the assembly worker in relation to the dashboard and the rapidity of the assembly line, it is very difficult to accurately align the corresponding threads of the cigar lighter socket and the clamp shell. As a result of this, it is possible for the threads to jam which can result in injury to the assembly worker if the clamp shell is caused to rotate rapidly in his hand due to misalignment and resultant "cross-threading." Another problem which can result from only partial engagement of the thread is that the clamp shell will not be fully pressed home against the rear of the dashboard or other panel and the resultant loose assembly must be repaired at a later point in the assembly process. The need for such corrections is highly undesirable because of the disproportionate expense involved in interruption of the assembly process and man time to correct the problem.

In accordance with the present invention, these problems of affixing cigar lighter sockets to dashboards with clamp shells are overcome by means on the clamp shell for automatically aligning the clamps with respect to the cigar lighter socket so that there is a substantial reduction in instances of improper threading of the cigar lighter socket and the clamp shell.

These and other features of the present invention may be more fully understood with reference to the drawings in which.

Figure 1:
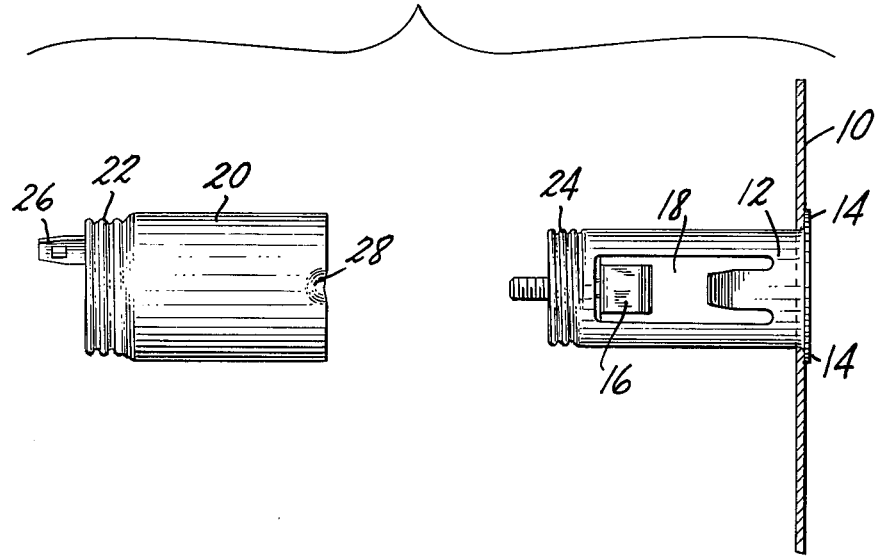
FIG. 1 is a side view of the clamp shell of the present invention.

In FIG. 1 there is shown a dashboard 10 with a cigar lighter socket assembly 12 butted against the front thereof with shoulders 14 of the cigar lighter socket assembly 12 on the outside of the dashboard. The cigar lighter socket assembly includes a bimetallic element 16 which expands when heated into opening 18 of the cigar lighter socket assembly. In order to prevent shorting of the bimetallic element 16 with the clamp shell 20, the clamp shell is made of a diameter at least 10% greater in diameter than the diameter of the cigar lighter socket assembly.

Figure 3:
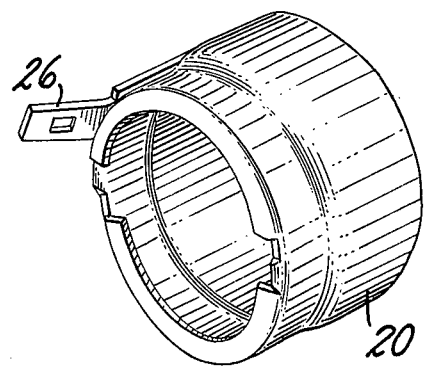
FIG. 3 shows an alternate form of thread for the clamp shell.

The clamp shell includes a threaded portion 22 at the end thereof which is adapted to engage with the threaded portion 24 of the cigar lighter socket assembly. It will be understood that while conventional screw threads are shown, it is possible to use other types of threading, especially on the clamp shell 20 including for example a stamped helix such as shown in FIG. 3. The important feature is that there be means provided for threaded engagement between the cigar lighter socket assembly and the clamp shell. The clamp shell also includes a lug 26 for electrical connection.

The cigar lighter socket assembly 12 is secured to the dashboard by screwing the clamp shell onto the cigar lighter socket assembly. As previously mentioned, this is normally accomplished by a worker holding the clamp shell while a machine rotates the cigar lighter socket assembly. Because of the required greater diameter of the clamp shell as compared to the diameter of the cigar lighter socket assembly, it will not infrequently occur that the threads will become misaligned during the assembly operation thus resulting in injury to the worker, an unsatisfactorily attached cigar lighter socket assembly, or the like.

Figure 2:
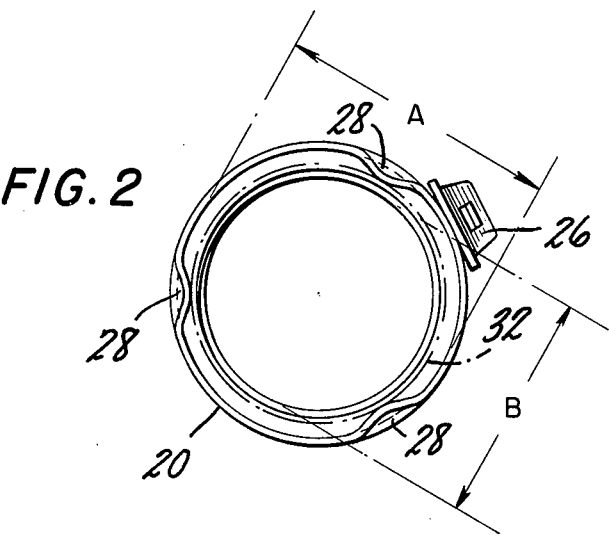
FIG. 2 is an end view of the clamp shell of FIG. 1 looking from the right side of FIG. 1.

In accordance with the present invention, alignment means are provided in the clamp shell in order to properly align the threads of the clamp shell with the threads of the cigar lighter socket assembly. This is accomplished by the inclusion of alignment means at the end of the clamp shell opposite the threaded end which alignment means substantially reduce the inside diameter of the clamp shell at that end to approximately the dimension of the outside diameter of the cigar lighter socket assembly. By the term "substantially reduce" it is meant that the effective diameter of the clamp shell with alignment means is no more than 5% greater in diameter than the outside diameter of the cigar lighter socket assembly. This is demonstrated in FIG. 2. In FIG. 2 there is shown the clamp shell 20 having an inside diameter A, and the cigar lighter socket assembly having an outside diameter B. Alignment means in the form of indentations 28 in the end of the clamp shell 20 reduce the effective diameter of the end of the clamp shell to the size of the dotted circle 32. As stated hereinbefore, diameter A is at least 10% greater than diameter B but the effective diameter 32 of the clamp shell caused by the alignment means is no more than 5% greater than the diameter B of the cigar lighter socket assembly.

The alignment means may be any means which will reduce the effective diameter of the end of the clamp shell as hereinbefore defined e.g. indentations, a flange, added tabs or the like. However, both for the sake of simplicity and for the sake of cost, it is preferred that these alignment means be indentations in the end of the clamp shell as shown. Since it is necessary that the alignment means center the cigar lighter socket assembly in the clamp shell, it will be understood that in most cases at least three alignment means are necessary. Of course, even where three alignment means are provided, it will be of no benefit to have them all located within 180° since they would then all be on one side of the clamp shell and there would be nothing to prevent misalignment on the other side of the clamp shell. It is thus the case that the alignment means must be spaced no more than about 170° from each other. In the preferred embodiment of the present invention, there are three alignment means in the form of indentations 28 and they are spaced approximately 120° apart about the circumference of the clamp shell.

It will be apparent to one skilled in the art that modifications can be made in the clamp shell while still meeting the above pre-requisites. For example, the entire end of the clamp shell 20 opposite the threaded end 22 could be crimped to the necessary degree to provide an opening of diameter not more than 5% greater than the diameter of the cigar lighter socket assembly and the same result would be achieved. Similarly, there could be but two alignment means positioned 180° from each other on the circumference of the clamp shell provided that each be of sufficient length so that there would be no more than a 170° arc without alignment means.

It will be understood that the claims are intended to cover all changes and modifications of the preferred embodiment of the invention, herein chosen for the purpose of illustration, which do not constitute departure from the spirit and scope of the invention.

What is claimed is:

1. In a clamp shell for securing a cigar lighter socket assembly.
   a. an essentially cylindrical member having opposed ends;
   b. the inside diameter of the cylindrical member being at least about 10% greater than the outside diameter of the cigar lighter socket assembly to be secured;
   c. one of said opposed ends having means for threaded engagement with a correspondingly threaded portion of the cigar lighter socket assembly; and
   d. the other of said opposed ends having alignment means to reduce the effective diameter of said other opposed end of the cylinder to a dimension no more than 5% greater than the outside diameter of the cigar lighter socket assembly.

2. The clamp shell of claim 1 wherein the alignment means comprise at least three indentations in the said other opposed end of the cylinder.

3. The clamp shell of claim 2 wherein the indentations are spaced no more than about 170° from each other.

4. The clamp shell of claim 2 wherein there are three indentations spaced at approximately 120° from each other.

* * * * *